United States Patent Office 3,430,524
Patented Mar. 4, 1969

3,430,524
DRILLING AND LIKE HEADS
Alan P. L. Thomas, Marston Hall, Marston Green,
Warwickshire, England
Filed Sept. 9, 1965, Ser. No. 486,042
U.S. Cl. 77—32.8          7 Claims
Int. Cl. B23b *39/10, 47/18;* F16d *27/08*

ABSTRACT OF THE DISCLOSURE

A drilling or like head comprising a tool-driving spindle having a screw-threaded portion disposed within and co-axial of, first, a nut with which it meshes and, secondly, a motor-driven sleeve with which it is rotatable and in which it is axially displaceable, and clutch-controlled gearing driven by the sleeve and adapted to rotate the nut in the same direction as but at different speeds from the spindle so as to advance the latter rapidly or slowly, or to terminate the rotation of the nut so as to retract the spindle.

---

This invention has reference to drilling, tapping, reaming, counter-boring or milling heads of the kind comprising a motor driven spindle which is provided with at least one tool-receiving chuck, is journalled within a casing adapted to be mounted upon the frame of a machine in which each workpiece to be operated upon is clamped or otherwise detachably secured, and is drivable axially within the casing, first in one direction through a working stroke when a tool received and held within the or each chuck is advanced towards and then performs a predetermined operation on a clamped workpiece, and secondly in the reverse direction through a return stroke to withdraw the tool or tools from the workpiece preparatory to repeating the cyle of operations.

One object of the present invention is to provide an improved head which includes a single electric motor and, when in use, automatically advances the tool or tools first rapidly towards the clamped workpiece to be operated upon and secondly at a predetermined, slower speed whilst the operation or operations is or are being performed, and at the completion of the operation or operations, returns the tool or tools rapidly to its or their initial position or positions.

Another object of the invention is to ensure that, in the event of a fault arising and resistance to the travel of the tool or any one of the tools becoming excessive, the head will cease to operate and the tool or tools will be returned at least partially towards its or their initial positions so that the head will "fail safe."

A further object of the invention is to enable the head to be mounted in a machine in either of two alternative positions so that the tool or tools may be advanced and returned either vertically or horizontally.

Still another object of the invention is to enable the speed at which the tool or tools is or are advanced when operating on a workpiece, to be varied accurately, easily and quickly.

Another object of the invention is to ensure that the thrust imparted to the tool or tools when the head is in use, is always co-axial to the tool-carrying spindle.

The above and other objects and advantages of the invention will become apparent upon consideration of the following specification and the accompanying drawings wherein there is disclosed preferred embodiments of the invention.

Figures 1, 2:
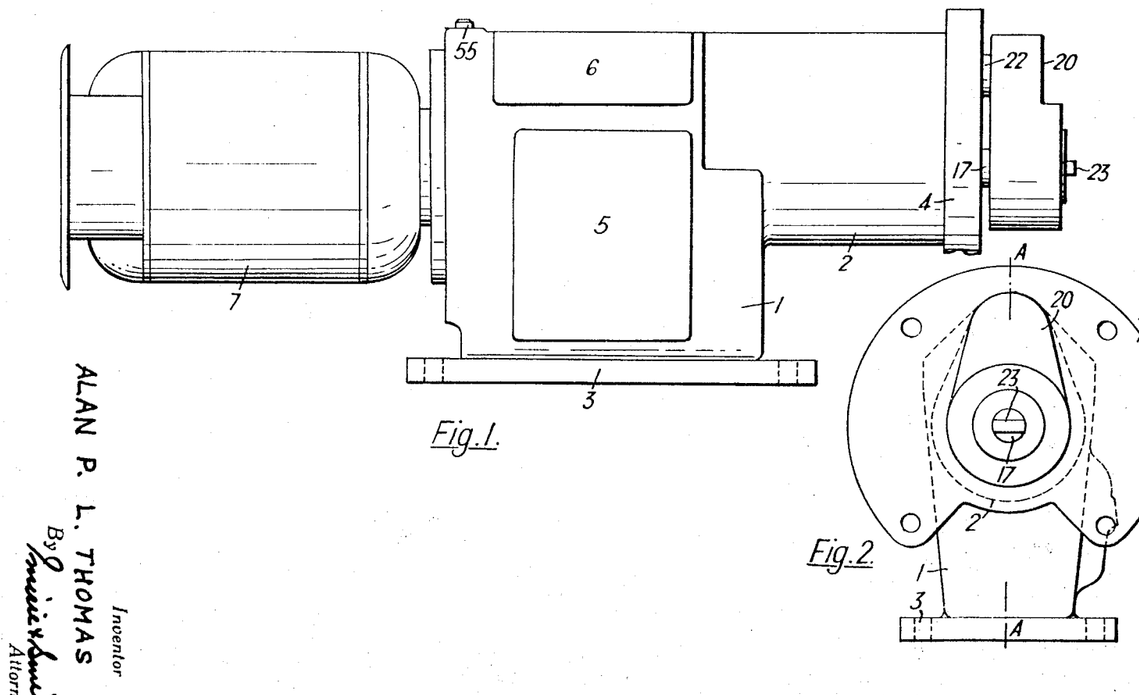
FIGURE 1 is a side elevation and FIGURE 2 is an end elevation of a drilling or like head constructed in accordance with one embodiment of the invention.
Figure 3:
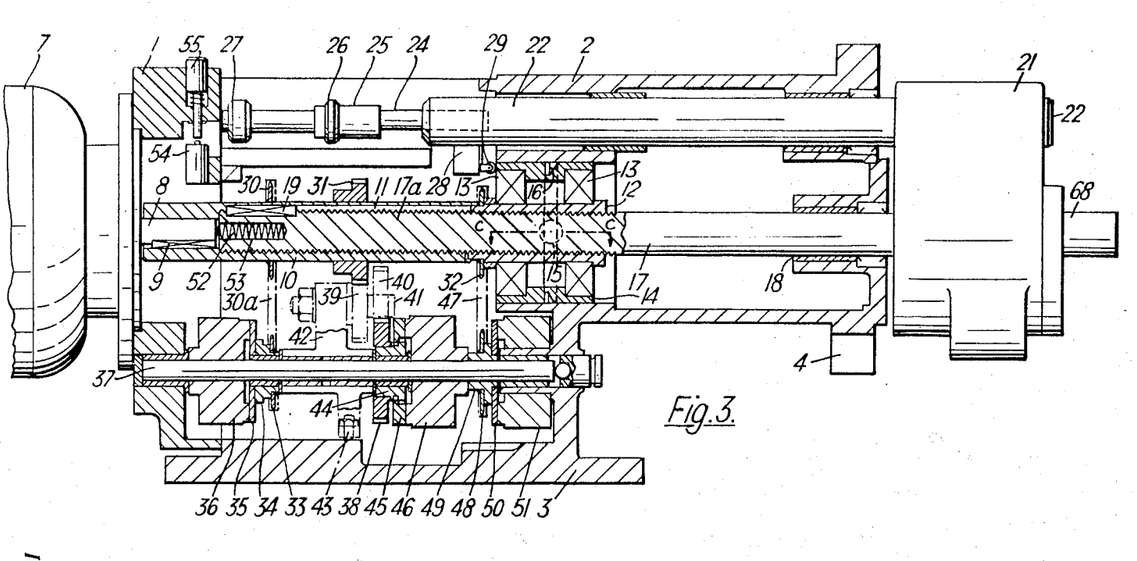
FIGURE 3 is a section along the line A—A, FIGURE 2, of a slightly modified head.

Each of the heads shown in FIGURES 1–3 is suitable for drilling, reaming, counter-boring, milling or performing similar operations on workpieces by rotating one or more bits or other tools in one and the same direction. The head comprises a casing consisting of a box-like body 1 from one wall of which a hollow throat 2 projects, a flange 3 being provided on the foot of the body parallel to the axis of the throat and a flange 4 being provided on the free end of the throat perpendicularly to the said axis. The flanges are formed with bolt holes and enable the head to be mounted on a machine preparatory to operating on workpieces clamped in the said machine, in either of two alternative positions, that is to say with the throat axis horizontal or vertical, without having to fit special overhead support columns for this purpose. The body is provided with removable, aperture-closing covers such as indicated at 5 and 6, FIGURE 1, so that, as and when desired, access may be obtained to driving and control gear housed within the casing.

A unidirectional, constant speed, electric motor 7 is mounted on and externally of the body wall opposite to the throat and the rotor shaft 8 of the motor extends into the body interior where (see FIGURE 3) it sockets into and is drivingly coupled by a key 9, to the adjacent end of a co-axial and rotatable drive sleeve 10. The drive sleeve has an internal and longitudinal spline 11 and its end remote from the motor sockets on to the adjacent end of a relatively rotatable and co-axial cylindrical nut 12 of which is journalled in bearings 13 installed in a housing 14 mounted within the body end of the throat. The housing is axially displaceable within the throat but, under normal operating conditions, is held against such displacement by the engagement of the V-shaped nose of a spring-loaded plunger 15 carried in the wall of the casing radially of the nut, in a V-section groove 16 formed in and extending around the external periphery and midway between the ends of the housing. The wall of the groove adjacent to the drive sleeve is perpendicular to the axis of the nut and spindle and is abutted by a flat face of the plunger nose so as to prevent axial displacement of the housing away from the said sleeve; however, the wall of the groove remote from the drive sleeve, is inclined to the axis of the nut and spindle and is abutted by a similarly inclined flat face of the plunger nose, so that, when the housing is forced towards the said sleeve, the plunger nose may be forced outwardly of the groove to permit axial displacement of the housing towards the said sleeve, such axial displacement being so limited that the plunger nose cannot be disengaged completely from the groove.

A threaded portion 17a of a spindle 17 which is journalled in a bearing bush 18 housed within the throat, extends through and screw-engages the nut, into and lengthwise of the bore of the drive sleeve. A drive-transmitting key 19 fixed in and projecting radially from the free end of the threaded spindle portion, engages and is slidable in the spline 11 thereby permitting axial movement but preventing rotary movement of the spindle relatively to the sleeve. The unthreaded portion of the spindle projects to the exterior of the throat where it extends through and is journalled in, but held against axial movement relatively to, a coupling block 20 (FIGURES 1 and 2) or a quill box 21 (FIGURE 3) which is fixed upon one end of a reciprocable steady or guidebar 22 extending, parallel to the spindle, through the throat, into the casing body so that the spindle and bar are axially reciprocable within the casing in unison with one another.

In the head shown in FIGURES 1 and 2, the spindle nose projects beyond the block 20 and a tool-receiving chuck of any known kind may be assembled thereto. However, and as described below with reference to FIGURE 4, the quill box 21 shown in FIGURE 3, is provided with a quill 68 which is rotatable by and at a greater speed than the spindle and projects from the box so that, likewise, a tool-receiving chuck of any known kind may be assembled thereto.

A trip rod 24 is fixed to and co-axially of the end of the guide bar which projects into the casing body, the said rod being rendered accessible from the exterior of the head when the cover plate 6 is removed. A control sleeve 25, which is surrounded by a collar 26 and is mounted around the trip rod, is clamped to but is adjustable longitudinally of the rod and the collar is clamped to but is adjustable longitudinally of the sleeve; in addition, a collar 27 is clamped upon the rod on the opposite side of the control sleeve to the guide bar. When the spindle and guide bar are reciprocated axially within the casing, the control sleeve is adapted to actuate a changeover switch, the sleeve-supported collar is adapted to actuate a forward limit switch, and the rod-supported collar is adapted to actuate a rear limit switch, the said switches (which are not shown) being mounted within the body 1. A safety switch 28 operable by displacement of a roller 29, is also mounted in the body, the roller being presented to and being displaceable by the nut housing 14 when the latter is displaced axially towards the drive sleeve.

Since the threaded portion of the spindle screw engages the nut, the spindle may be reciprocated axially within the drive sleeve by being rotated relatively to the nut. When the head is operating upon a workpiece, the spindle and nut are rotated in the same direction and the spindle is driven outwardly of the casing by rotating the nut at a greater speed, and is driven in the reverse direction to withdraw the tool or tools from the workpiece, by terminating the rotation of the nut.

To enable this result to be obtained, a sprocket wheel 30 and a gear wheel 31 surround and are fast upon the drive sleeve 10, and a sprocket wheel 32 surrounds and is fast upon the nut 12. The sprocket 30 is drivingly coupled by a chain 30a to a sprocket wheel 33 which surrounds and is fast upon the hub 34 of the armature 35 of a rapid approach electro-magnetic clutch having a solenoid coil which is secured within a cylindrical housing indicated at 36, the sprocket 33 being of smaller diameter than the sprocket 30 so that whenever the drive sleeve and spindle are rotated by the rotor shaft 8, the hub and armature are rotated at a considerably greater speed. The hub and armature are free to rotate about a lay shaft 37 which is journalled in the casing body 1 parallel to the drive sleeve and spindle and upon which the cylindrical housing of the rapid approach clutch is fast. The gear wheel 31 is drivingly coupled to a gear wheel 38 rotatably carried by the lay shaft, through two pick-off gear wheels 39, 40 which are in constant mesh with the wheels 31 and 38 respectively, are rotatable about an axle 41 fixed in one arm of a jockey lever 42, and are rendered accessible from the exterior of the casing when the cover plate 5 is removed. The jockey lever is journalled upon the lay shaft and a second arm thereof is provided with a clamping screw 43 which is tightened against the internal surface of the body 1 to lock the lever against movement relatively to the casing. The gear wheel 38 is fast upon the hub 44 of the armature 45 of a feed electro-magnetic clutch having a solenoid coil which is secured within a cylindrical housing, indicated at 46, fast upon the lay shaft, the hub 44 being free to rotate about the said shaft. The ratios of the gear wheels 31, 39, 40 and 38 are such that whenever the drive sleeve and spindle are rotated by the rotor shaft 8, the hub and armature of the feed clutch are rotated at a speed which is greater than the speed of the spindle but less than the speed of the hub and armature of the rapid approach clutch, and which is capable of being changed by replacing the pick-off gear wheels 39, 40, by another pair of gear wheels of different diameters after releasing the clamping screw 43 to enable the jockey lever to be turned about the lay shaft and subsequently re-tightening the screw after meshing the fresh gear wheels with the gear wheels 31 and 38 respectively.

The sprocket 32 is drivingly coupled by a chain 47, to a sprocket 48 which is fast upon the hub 49 of the armature 50 of an electro-magnetic brake clutch having a solenoid coil which is secured within a cylindrical housing indicated at 51, the hub 49 being fast upon the lay shaft and the housing 51 being fixed in the body wall from which the throat 2 projects. The sprockets 32 and 48 are of the same diameter so that whenever the lay shaft is rotated, the nut 12 is rotated at the same speed.

Upon starting the motor 7 the drive sleeve and spindle are rotated idly at the speed of the rotor shaft 8 and the nut rotates with the spindle and at the same speed. A manually actuated initiating switch (not shown) is closed to energise the coil of the fast approach clutch, with the result that the armature 35 and the sprocket 33, both of which are being rotated by the chain 30a, are clutched to the housing 36 thereby rotating the said housing, the lay shaft, sprockets 48 and 32, and the nut at a considerably greater speed than the spindle. The spindle is therefore driven outwardly of the throat so that any chuck-supported tool fitted to the spindle nose 23 (or quill 68), rapidly approaches a workpiece to be operated upon; since the coupling block 20 (or quill box 21) and steady bar 22 travel forwardly with the spindle, the trip rod 24 is displaced axially within the body 1. After the rod has travelled a predetermined distance, the control sleeve 25 actuates the changeover switch so as to de-energise the coil of the rapid approach clutch, thereby de-clutching the armature 35 from the housing 36, and energise the coil of the feed clutch, thereby clutching the armature 45 to the housing 46 and rotating the lay shaft, sprockets, 48, 32 and nut 12 at a speed which, although lower than the speed at which the nut was rotated when the coil of the rapid approach clutch was energised, is still greater than the spindle speed so that the outward travel of the spindle is continued although relatively slowly. The changeover switch is actuated as the tool or tools is or are about to contact and commence operating on the workpiece and the collar 26 is so set along the length of the control sleeve that the spindle continues its relatively slow outwards travel until the tool or tools has or have completed its or their operation or operations on the workpiece, whereupon the collar actuates the forward limit switch to de-energise the coil of the feed clutch and energise the coil of the brake clutch. The result of energising the coil of the brake clutch is that the armature 50 is clutched to the fixed housing 51, thereby terminating the rotation of the lay shaft and nut and driving the rotating spindle axially and rapidly in the reverse direction, that is inwardly of the throat and drive sleeve. When the spindle and trip rod reach their initial positions, a coil spring 52 held within and projecting from a blind axial bore 53 in the spindle end adjacent to the motor, abuts and is compressed by the shaft 8, and the collar 27 actuates the rear limit switch to de-energise the coil of the brake clutch so that drive sleeve, spindle and nut are rotated idly once again. Alternatively, and if so desired, the actuation of the rear limit switch may also open the circuit of and stop the motor or re-energise the coil of the rapid approach clutch; in the latter case, the sequence of operations is repeated automatically and a fresh workpiece clamped within the machine during the reverse travel and subsequent rapid approach of the spindle, is operated upon.

To enable, for example, the adjustment of the control sleeve 25 and collars 26 and/or 27 to be facilitated and the head to be set up generally for performing any required operation to be performed on a workpiece, an inching switch 54 mounted in the body 1 and adapted to be actuated from the exterior of the casing by a manually operable push button 55, is capable of energising temporarily and for so long as the button is depressed, first the coil of the rapid approach and then the coil of the feed clutch so that the changeover switch and then the forward limit switch are operated at any desired instant during the forward travel of the spindle and the relative durations of the rapid approach and feed movements of the spindle may be varied as desired.

Should the resistance to the forwards travel of the spindle during its rapid approach or feed movements become excessive in the event, for example, of a tool being blunt, breaking whilst operating on a workpiece, or fouling an obstruction, the spindle displaces the nut and its bearing housing axially within the throat in the opposite direction to the direction of spindle travel. As a consequence, the plunger 15 is forced partially out of engagement with the circumferential groove 16 and the housing abuts and displaces the roller 29 to operate the safety switch and de-energise whichever of the coils of the rapid approach or feed clutches happens to be energized at the time the excessive resistance is created and, at the same time, to open the circuit of and stop the motor 7. If, when the safety switch is operated, a tool is embedded in a workpiece, the momentum of the rotating components of the motor and head is sufficient to withdraw the tool from the workpiece because, due to transmission and bearing friction, the speed of the nut will reduce more rapidly than the spindle speed and, therefore, the spindle will be driven in its reverse or return direction of axial travel whilst the said rotating components come to a standstill, and the head will "fail safe." Similarly, the tool is withdrawn from a workpiece in the event, for example, of a power failure. Such automatic withdrawal of the tool has the advantage that the possibility of the head being restarted whilst the tool is under load, is reduced to a minimum. The reaction between the inclined wall of the groove and inclined face of the nose of the spring-loaded plunger returns the nut housing to its initial position when the spindle ceases to rotate.

The compression of the spring 52 at the end of the reverse travel or stroke of the spindle, minimises the possibility of the spindle being locked in the nut due, for example, to the failure of the rear limit switch to de-energise the brake clutch coil at the termination of the reverse or return stroke of the spindle, because the compressed spring tends to drive the spindle outwardly of the casing and relieve the locking friction.

Figure 4:
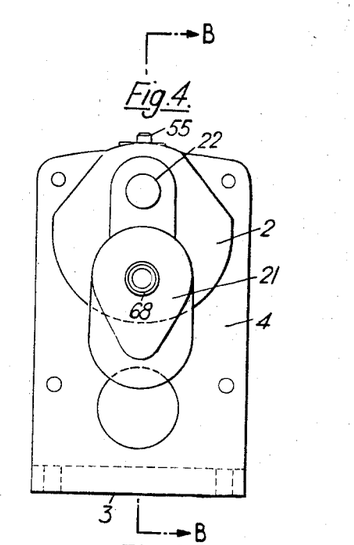
FIGURE 4 is an end elevation of an alternative construction of the head.
Figure 5:
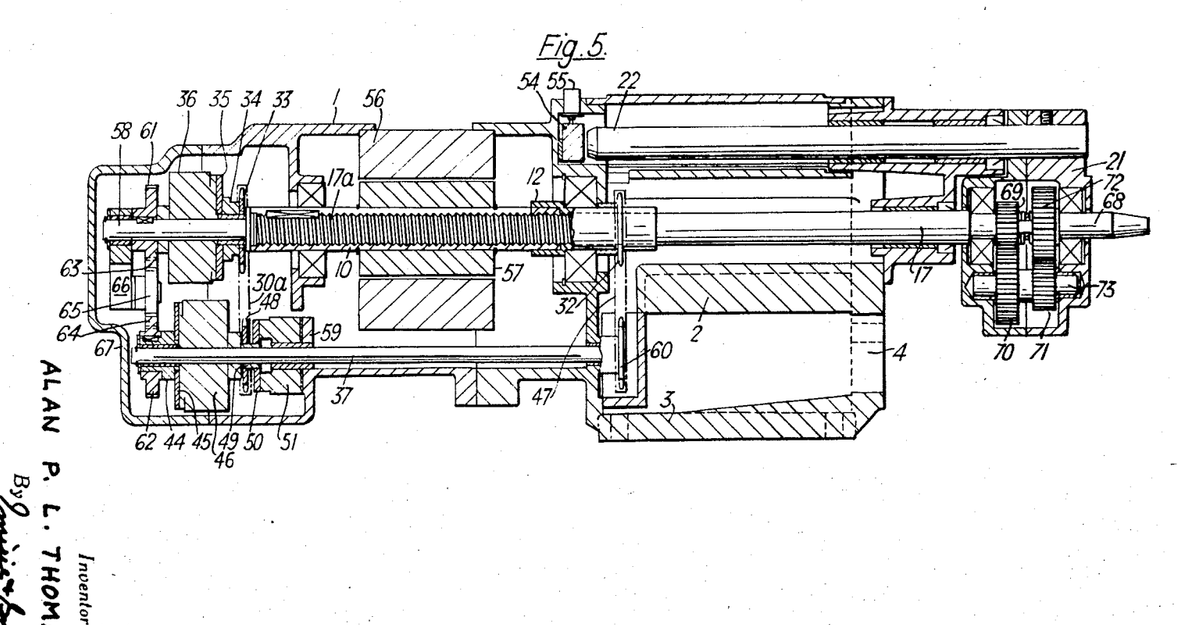
FIGURE 5 is a section along the line B—B, FIGURE 4.

In the modified construction of head shown in FIGURES 4 and 5, the motor 7 is replaced by a power unit consisting of a stator 56 and rotor 57 housed within the casing body 1 around and concentrically to the drive sleeve 10 to which the rotor is made fast, with the result that the overall dimensions and weight of the head are reduced by a considerable amount.

In the head shown in FIGURES 4 and 5, the end of the drive sleeve remote from the throat 2, is provided with an integral and co-axial stub axle 58 around which the hub 34 of the armature 35 of the rapid approach clutch is mounted and is relatively rotatable, the cylindrical housing 36 of the said clutch being fast upon the stub axle and the sprocket 33, which is fast upon the hub, being drivingly coupled to the sprocket 48 of the brake clutch by the chain 30a, the latter sprocket being fast upon the hub 49 of the armature 50, the hub 49 being fast upon the lay shaft 37, and the coil housing 51 of the brake clutch being fixed upon a wall 59 of the body 1. The lay shaft end adjacent to the throat 2, has a sprocket 60 fast thereon and this sprocket is drivingly coupled to the nut sprocket 32 by the chain 47.

On the opposite side of the rapid approach clutch housing 36 to the stator rotor unit, a gear wheel 61 is keyed to the stub axle 58. This gear wheel is drivingly coupled to a gear wheel 62 keyed to the hub 44 of the feed clutch armature 45, through a gear train consisting of a pair of pick-off gears 63, 64 and a gear wheel 65 journalled upon a jockey arm 66 carried by the stub axle. The pick-off gears are rendered accessible for removal and replacement by another pair of gears of different diameters, by removing a detachable cover 67 assembled to the end of the body 1 remote from the throat 2. The hub 44 and armature 45 are free to rotate about the lay shaft, but the cylindrical housing 46 of the feed clutch is fast upon the said shaft. Hence the lay shaft is rotated in the same direction as, but at a greater speed than, the sleeve 10, and the nut is rotated in the same direction and at the same speed as the lay shaft, when the coil of either the rapid approach clutch or feed clutch is energised, and the lay shaft and nut are held against rotation when the brake clutch coil is energised.

The control sleeve 25 and collars 26, 27 (not shown in FIGURE 5) are provided on the steady bar 22 and are adapted to actuate the changeover forward and rear limit switches respectively so that the cycle of operations of the head shown in FIGURES 4 and 5 is the same as that of the heads shown in FIGURES 1–3. However, in the head shown in FIGURE 3 and in the head shown in FIGURES 4 and 5, the tool-carrying quill 68 is journalled in and co-axially of the nose of the spindle 17, projects from the quill box 21 and is rotatable in the same direction as the spindle but at a speed considerably in excess of the spindle speed, through a train of gear wheels 69, 70, 71 and 72 housed within the quill box, the wheel 69 being keyed to the spindle nose and being in constant mesh with the gear wheel 70 which is keyed upon a shaft 73 journalled in the box parallel to the spindle and quill, whereas the gear wheel 71, which is also keyed upon the shaft 73, is in constant mesh with the gear wheel 72 which is keyed upon the inner end of the quill.

Figure 6:
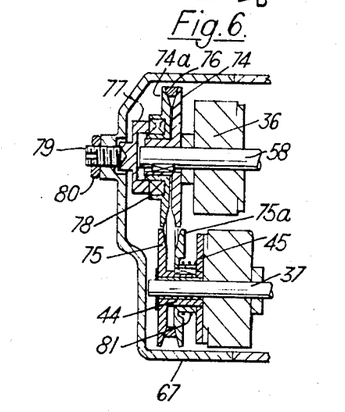
FIGURE 6 is a sectional elevation of an alternative type of variable speed drive transmitting mechanism capable of being installed in the head shown in FIGURES 4 and 5.

If desired, and as shown in FIGURE 6, the gear train 61–65 through which drive is transmitted from the stub axle 58 to the armature hub of the feed clutch, may be replaced by split pulleys 74, 74a and 75, 75a and a tensioned drive transmitting belt 76; the portion 74 of the driving pulley 74, 74a is keyed to the stub axle 58, whereas the portion 74a is slidable axially of the said axle and is urged towards the portion 74 by a stirrup 77 which acts through a thrust bearing 78 and is urged towards the bearing by a threaded stud 79 mounted in the detachable cover 67 and axially adjustable from the exterior of the body 1 after a lock nut 80 has been slackened. The portion 75 of the driven pulley 75, 75a, is integral with the hub 44 of the feed clutch armature 45, the other portion 75a of the pulley being free to slide axially upon, but being held against rotation relatively to, the said hub and being urged lengthwise of the sleeve towards the portion 75, by a compressed coil spring 81. When, as shown in FIGURE 6, the portion 74a of the driving pulley is urged into contact with the portion 74 by the stirrup 77 and threaded stud, the belt is forced radially outwards to the mouth of the pulley groove; as a consequence, the tensioned belt is forced radially inwards of the groove in the driven pulley, thereby forcing the portion 75a away from the portion 75 against the action of the spring 81 and the driven pulley is rotated at its maximum speed relatively to the driving pulley, the relative speeds being variable gradually between the said maximum and a minimum, which is obtained when the driven pulley portion 75a is spring driven into contact with the portion 75, by screwing the stud 79 outwardly of the cover 67.

Similarly, and if so desired, the gear train 31, 38, 39, 40 of the heads shown in FIGURES 1 and 2 and in FIGURE 3 respectively, may be replaced by two split pulleys and a tensioned drive transmitting belt, in which case, the threaded stud may be located in the top of the casing body 1 and may act on the axially slidable portion of the driving pulley through a bell-crank lever which replaces the stirrup 77 and is pivoted internally of the body with one arm extending forwardly towards the throat 2 into abutment with the inner end of the stud, and with the other and bifurcated arm depending downwardly into abutment with the outer race of thrust bearing 78.

Figure 7:
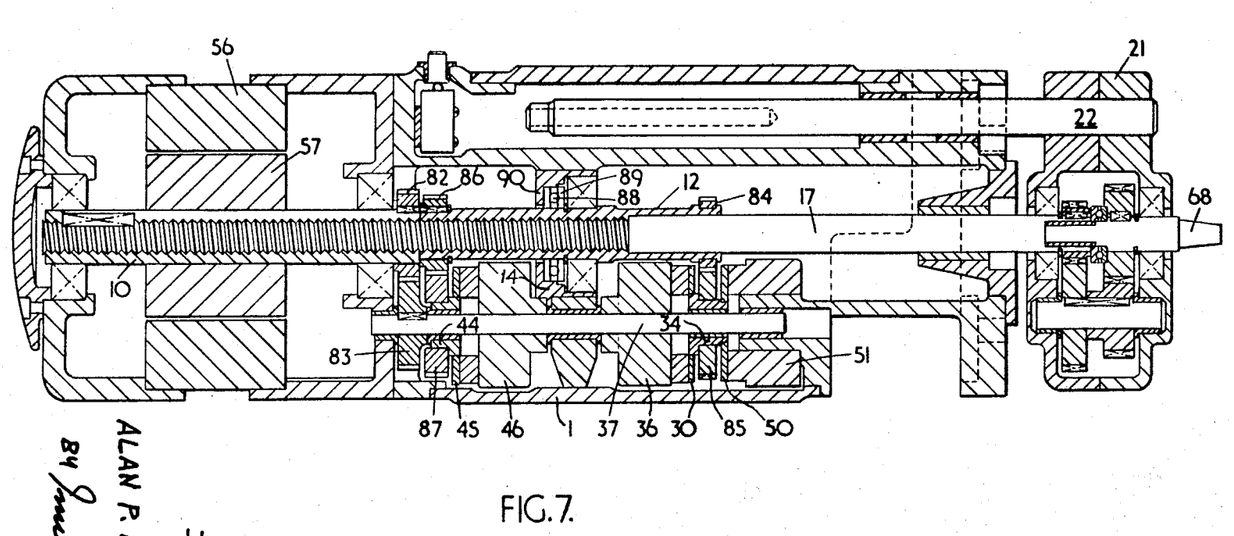
FIGURE 7 is a sectional elevation of another alternative construction of head.
Figure 8:
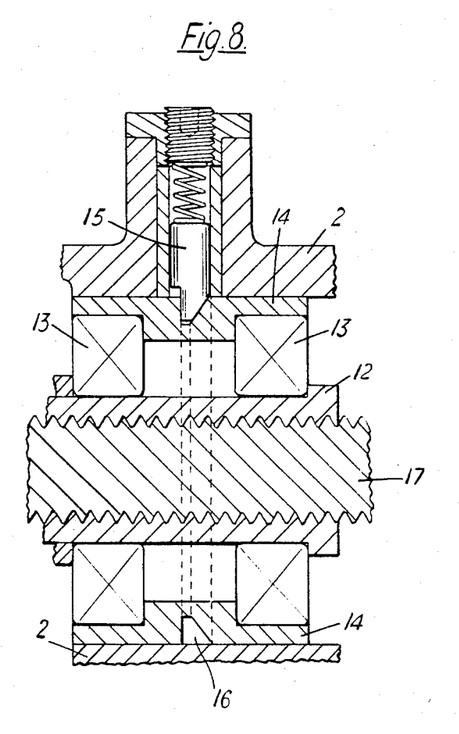
FIGURE 8 is a section, on an enlarged scale, taken along line C—C, FIGURE 3.

In the alternative construction of head shown in FIGURE 7, drive from the rotor 57 of a stator-rotor unit 56, 57, is transmitted continuously to the lay shaft 37 from the drive sleeve 10 through a pair of constantly meshing gears 82, 83 which are keyed respectively to the sleeve and lay shaft and are of equal diameters so that the sleeve and shaft are rotated in opposite directions but at equal speeds. Further, drive from the lay shaft to the nut 12, is transmitted either through a pair of constantly meshing gears 84, 85 or a pair of constantly meshing gears 86, 87.

The gear 84 is fast upon the end of the nut remote from the stator-rotor unit and the gear 85 is fast upon the hub 34 of the rapid approach clutch, the said hub being rotatable about the lay shaft and having the armature 35 fast thereon, whereas the coil housing 36 of the clutch is fast upon the shaft 37. The diameters of the gears 84, 85 are respectively less and greater than the gears 86, 87 so that, when the armature 35 is clutched to the housing 36, the nut is rotated in the same direction as, but at a greater speed than, the drive sleeve and spindle 17 which, again, are rotated in unison by the rotor 57.

The gear 86 is fast upon the end of the nut adjacent to the stator-rotor unit, whereas the gear 87 is fast upon the hub 44 of the feed clutch, the armature 45 of this clutch being fast upon the said hub whereas its coil housing 46 is fast upon the shaft 37. Hence, when the coil of the feed clutch is energised and the armature 45 is clutched to the housing 46, the nut is rotated in the same direction as the drive sleeve. However, the diameter of the gear 87 is greater than the diameter of the gear 83 although less than the diameter of the gear 85, and the diameter of the gear 86 is less than the diameter of the gear 82 but greater than the diameter of the gear 84 so that, when the armature 45 is clutched to the housing 46, the nut will be rotated faster than the spindle 17 but slower than when being rotated by the meshing gears 84, 85.

The armature 50 of the brake clutch is fixed to the armature 34 on the opposite side of the gear 85 to the armature 35 of the rapid approach clutch. Consequently when the coil of the brake clutch is energised and the armature 50 is clutched to the coil housing 51 which is fixed with the body 1 of the casing of the head, the gears 84, 85 and nut 12 are locked against rotation so that the spindle 17 is driven rapidly inwards of the body.

The nut is journalled in a housing 14 secured within the body 1 and, upon creation of excessive resistance to axial spindle travel outwardly of the casing, is displaceable axially within the housing in the reverse direction, against the action of a resilient ring 88 accommodated within the housing between an external flange 89 on the nut and an internal lip 90 on the housing.

To enable any of the alternative heads shown in the drawings to be used as a tapping head, the unidirectional motor 7 or rotor-stator unit 56, 57, as the case may be, is replaced by a reversible motor or rotor-stator unit, the electro-magnetic brake clutch is omitted and, when actuated by the control sleeve collar 26, the forward limit switch reverses the motor, or rotor-stator unit thereby reversing the direction of rotation of the drive sleeve, spindle and nut.

Further, since in any of the alternative heads shown in the drawings, the speed at which the lead nut 12 is rotating is reduced rapidly by transmission and bearing friction immediately the drive to the nut is terminated, the brake clutch may be omitted, if so desired, since the primary purpose of this clutch is merely to terminate the rotation of the lay shaft and nut as and when an operation on a workpiece is completed, thereby increasing to a maximum and substantially instantaneously, the difference between the relative speeds of the nut and spindle, augmenting or increasing the rate at which the spindle is driven through its reverse or return stroke, and reducing the duration of each cycle of operations.

In addition to the heads being suitable for horizontal or vertical mounting due to the presence of the flanges 3 and 4, and having the characteristic that they always "fail safe" due to the tendency of the lead nut speed to slow down under the action of transmission and bearing friction, the invention has the advantage that in each of the heads one and the same motor or rotor-stator unit is adapted both to advance and retract the spindle and tool or tools to and from a workpiece and to drive the tool or tools whilst operating on the workpiece; that the thrust imparted to the tool or tools, even when a quill gear box is provided, is always co-axial of the spindle; that the feed speed of the spindle of the heads shown in FIGURES 1–2 is variable either by replacement of pick-off gears or adjustment of split pulleys; that the torque applied to the spindle and tool or tools may be varied merely by changing the value of the current supplied to the feed clutch coil; and that the head comprises a minimum number of working parts which are readily accessible upon removing a corresponding one of any desired number of closure plates provided on the casing.

Since, as pointed out above, the principles of the invention herein disclosed are applicable in various embodiments reference should be had to the appended claims in determining the scope of the invention.

The embodiments of the invention in which an exclusive property or privilege is claimed are defined as follows:

1. A drilling or like head comprising a casing, a spindle, a drive sleeve and a nut journalled in the casing in co-axial relationship, the spindle being displaceable axially within the casing, the sleeve and nut being mounted around the spindle and the sleeve being rotatable with and the nut being rotatable relatively to but making screw engagement with the spindle, a motor for rotating the sleeve, means including clutches for transmitting drive from the sleeve to the nut and rotating the nut at different speeds relatively to the spindle so that the spindle is displaced axially at different speeds relatively to the nut, and means provided on the spindle externally of the casing for carrying a tool and for transmitting drive from the spindle to the tool, two clutches being included in a corresponding one of two different drive transmission means housed within the casing and adapted to transmit drive from the drive sleeve and spindle to the nut and to rotate the nut in the same direction but at a greater speed than the said sleeve and spindle and one of the said transmission means being adapted to rotate the nut at a greater speed than that at which the nut is adapted to be rotated by the other transmission means.

2. A drilling or like head as claimed in claim 1, wherein switching means are provided for operating the two clutches in succession and for timed periods, to drive the spindle axially of the drive sleeve and nut towards a workpiece to be operated upon, first at a relatively high rate by operating the clutch included in the drive transmission means adapted to rotate the nut at the higher speed, and subsequently at a relatively slow rate by operating the clutch included in the drive transmission means adapted to rotate the nut at the slower speed.

3. A drilling or like head as claimed in claim 2 wherein the switching means are adjustable to vary the periods during which the nut is rotated at the relatively high and low speeds, and an inching switch actuatable by a push button mounted in and operable from the exterior of the casing, is adapted to operate the clutches in succession.

4. A drilling or like head comprising, in combination,
a casing,
a spindle journalled in said casing for axial displacement relative thereto and projecting therefrom to drive a tool both rotationally and axially,
a drive sleeve and a nut journalled in said casing in co-axial relationship, said spindle having a threaded portion engaged in said nut and including means for coupling said spindle for rotation with said sleeve but allowing for axial displacement relative thereto,
means for driving said sleeve,
first power path means for driving said nut at a first rotational speed which is greater than the rotational speed of said sleeve, whereby said spindle is advanced axially at a relatively fast rate,
second power path means for driving said nut at a second rotational speed which is less than said first speed but greater than the rotational speed of said sleeve, whereby said spindle is advanced axially at a relatively slow rate,
third means for causing said sleeve to rotate at a greater speed than said nut,
and control means for preferentially actuating one of said first and second power path means and said third means.

5. A drilling or like head as defined in claim 4 wherein said control means is responsive to axial displacement of said spindle.

6. In a drilling or like head
including a casing having a rotatable spindle adapted to be axially displaced relative to the casing for advancing a tool at different rates relative to a workpiece, the improvement comprising,
said spindle having a threaded portion,
a nut journalled in said casing and engaging said threaded portion of the spindle,
drive means for rotating said spindle at a predetermined speed,
means coupling said drive means to said nut for selectively rotating said nut at different speeds which are greater than said predetermined speed to axially advance said spindle relative to the casing,
and brake means for selectively stopping said nut whereby said spindle is retracted relative to a workpiece.

7. A drilling or like head comprising, in combination,
a body having a hollow interior,
a quill shaft rotatably journalled in said body,
a spindle journalled within said body concentrically of and projecting into said quill shaft, said spindle projecting from one end of said quill shaft and extending therefrom outwardly of the body,
tool holding means carried by said spindle,
a nut journalled within said body adjacent said one end of the sleeve, said spindle having a threaded portion normally disposed in retracted position within said quill shaft and engaged within said nut, and
a key element joining said spindle to said quill shaft for common rotation of these shafts while allowing axial movement of the spindle with respect to the quill shaft,
means for driving said quill shaft,
a countershaft journalled within said body parallel to said quill shaft,
first and second selectively engageable power paths between said quill shaft and said countershaft for driving said countershaft at different speeds,
a third power path between said countershaft and said nut,
brake means for selectively braking said nut to hold it against rotation,
and control means for sequentially engaging said first power path while said brake means is deactivated, engaging said second power path while said brake means is deactivated, and actuating said brake means while said first and second power paths are disengaged, the first and second power paths being effective each to drive said nut at a rotational speed greater than the rotational speed of said quill shaft, whereby the sequence effects different speeds of extension of the spindle with respect to the quill shaft while the first and second power paths are effective, and retracts the spindle when the nut is braked.

References Cited

UNITED STATES PATENTS

| | | | |
|---|---|---|---|
| 2,566,084 | 8/1951 | Esseling | 77—34.4 |
| 1,539,069 | 5/1925 | Brockett | 77—6 |
| 1,950,509 | 3/1934 | Melling | 77—32.8 |
| 2,322,237 | 6/1943 | Johansen | 77—34.4 |
| 3,224,301 | 12/1965 | Vickers | 77—33.5 |

FRANCIS S. HUSAR, *Primary Examiner.*

U.S. Cl. X.R.

77—32.9, 34.4; 10—139; 192—48.2, 51, 18